(12) United States Patent
Akbayir

(10) Patent No.: US 6,285,413 B1
(45) Date of Patent: Sep. 4, 2001

(54) METHOD AND APPARATUS FOR DYNAMIC CONTRAST IMPROVEMENT IN VIDEO PICTURES

(75) Inventor: Sahmusa Akbayir, Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/324,495

(22) Filed: Jun. 2, 1999

(30) Foreign Application Priority Data

Jun. 2, 1998 (DE) .................................................. 98109976

(51) Int. Cl.[7] ...................................................... H04N 6/72
(52) U.S. Cl. ............................ 348/678; 348/671; 348/673
(58) Field of Search ..................................... 348/671, 673, 348/678

(56) References Cited

U.S. PATENT DOCUMENTS

| | | | |
|---|---|---|---|
| 4,654,710 | 3/1987 | Richard | 358/169 |
| 4,862,270 | 8/1989 | Nishio | 358/160 |
| 5,099,330 | * 3/1992 | Fuse et al. | 358/169 |
| 5,162,902 | * 11/1992 | Bell et al. | 358/168 |
| 5,191,420 | * 3/1993 | Lagoni et al. | 358/168 |
| 5,221,963 | 6/1993 | Hashimoto et al. | 358/209 |
| 5,422,680 | 6/1995 | Lagoni et al. | 348/674 |
| 5,517,333 | 5/1996 | Tamura et al. | 358/158 |
| 5,777,590 | * 7/1998 | Saxena et al. | 348/671 |
| 5,963,665 | * 10/1999 | Kim et al. | 348/673 |
| 6,075,574 | * 6/2000 | Callway | 348/673 |
| 6,111,980 | * 8/2000 | Sano et al. | 382/167 |

FOREIGN PATENT DOCUMENTS

| | | | |
|---|---|---|---|
| 454417A2 | 10/1991 | (EP) | H04N/5/57 |
| 677959A1 | 10/1995 | (EP) | H04N/5/44 |
| 2575885 | 1/1985 | (FR) | H04N/5/20 |
| WO97/33271 | 9/1997 | (WO) | G09G/5/10 |

* cited by examiner

Primary Examiner—Reinhard J. Eisenzopf
Assistant Examiner—Brian P. Yenke
(74) Attorney, Agent, or Firm—Joseph S. Tripoli; Paul P. Kiel

(57) ABSTRACT

A method and apparatus for dynamic contrast improvement in video pictures. There is a strong demand for picture contrast but each video display has a limited dynamic range. The picture contrast can't be increased by simply increasing the video signal amplitude because exceeding the display dynamic range in some video scenes causes unwanted disturbing effects. According to the present invention the video pictures are analysed framewise in real time and the parameters of a transfer function for contrast improvement are adjusted depending on the analysis results for the best subjective picture quality.

15 Claims, 11 Drawing Sheets

FIG. 13

METHOD AND APPARATUS FOR DYNAMIC CONTRAST IMPROVEMENT IN VIDEO PICTURES

BACKGROUND OF THE INVENTION

The invention relates to a method and apparatus for dynamic contrast improvement of video pictures.

In the field of video display design there is a strong demand for picture contrast but each video display has a limited dynamic range. Especially the flat display panels like LCD and plasma displays have a lower dynamic range compared to the CRT displays. The picture contrast can't be increased by simply increasing the video signal amplitude is because exceeding the display dynamic range causes unwanted disturbing effects.

SUMMARY OF THE INVENTION

It is an object of the invention to disclose a method and an apparatus which makes efficient use of the display dynamic range to increase the picture contrast and quality. According to the present invention the picture contrast is optimised by analysing the picture contents of the displayed video pictures and adjusting the contrast dependent on the results of the picture content analysis step. More specifically, the basic solution according to the invention is to analyse the video pictures framewise in real time and adjust the parameters of a transfer function for contrast improvement depending on the analysis results for the best subjective picture quality.

Advantageous additional embodiments of the inventive method are disclosed below. It has been found that the use of a dual segment transfer function gives good results. The preferred dual segment transfer function which is used in one embodiment consists of two segments with an adaptive pivot point which separates the two segments. A lower segment for dark samples and an upper segment for light samples.

Each image frame is analysed for different characteristics. The image average brightness, the dark sample distribution and the frame peak value. In a preferred embodiment all the three parameters are used to adjust the transfer function.

The gain of the lower segment is adaptive to the dark sample distribution. A higher gain results from fewer dark samples and a lower gain from a higher number of dark samples. The gain of the upper segment is adaptive to the frame peak value. It is computed in the way that the detected peak value lower than the nominal peak value for full contrast, will be moved to the nominal peak value. If the detected peak value is equal or higher than the nominal peak value then a gain of 1.0 is used (no change). In the other direction the computed theoretical gain is limited to a maximum value in order to avoid unnatural effects.

The third parameter of the transfer function is the pivot point. It is adaptive to the average image brightness and allows to make dark pictures lighter and increase the contrast. Low average brightness values move the pivot point to lower and high average brightness values to higher levels.

A new kind of peak value determination has been developed taking into account the width of the peaks in order to avoid modulation of the segment gain.

In order to smooth the results of the contrast improvement method, the values of the image analysis unit, i.e. average image brightness, dark sample distribution and frame peak value are filtered preferably with an IIR filter.

According to one solution the inventive apparatus comprises an image analysis unit in which the video pictures are analysed regarding to their picture content and a transfer function adaptation unit in which the parameters of the transfer function for contrast improvement are adapted based on the results achieved in the image analysis unit.

Advantageous additional embodiments of the inventive apparatus are also disclosed.

For preparation of the luminance signal adaptive to the signal to noise ratio of the video signal, an adaptive signal splitter is provided in which a noise reduced luminance signal is generated to which the transfer function is applied afterwards.

In particular the adaptive signal splitter may comprise a low pass filter in which the luminance signal is filtered and the low pass component of the signal is fed to the image analysis unit. The low pass filtered signal is used for image analysis in order to reduce the noise influence.

In a more specific embodiment of the inventive apparatus the adaptive signal splitter comprises an adaptive coring unit wherein the high pass component of the luminance signal is reduced from noise and small detail signal components adaptive to an estimate of the signal to noise ratio of the luminance signal by applying a corresponding coring level to the high pass component. To this noise reduced signal component is the low pass component signal added, thus providing the noise reduced luminance signal.

A further improvement can be achieved with the measures disclosed in claim 15. Adding the noise and small details enclosing signal component which has been cut by the adaptive coring unit to the resulting output signal after applying the transfer function allows for a reduction of the noise amplification without a loss of small detail signals. Since the coring function does not distinguish between noise and image signals, a sharpness loss would have been caused otherwise due to the missing of high frequency small amplitude signal components.

In order to compensate for the effect of the processing of the luminance component on the colour saturation it is advantageous to provide a colour saturation compensation unit which processes the chrominance signals accordingly to compensate for this effect.

BRIEF DESCRIPTION OF THE DRAWING

Exemplary embodiments of the invention are illustrated in the drawings and are explained in more detail in the following description. In the figures.

DESCRIPTION OF THE PREFERRED EMBODIMENTS

The basic function of the dynamic contrast improvement method DCI according to the invention is to analyse the picture framewise in real time and adjust the parameters of a transfer function depending on the analysis results for the best subjective picture quality. As the luminance signal component of a video signal determines mainly the picture contrast, the new dynamic contrast improvement method applies only the luminance signal to the transfer function which assigns to each luminance signal point (pixel of the video picture) an output value thus resulting in improved picture contrast and quality.

Figure 1:
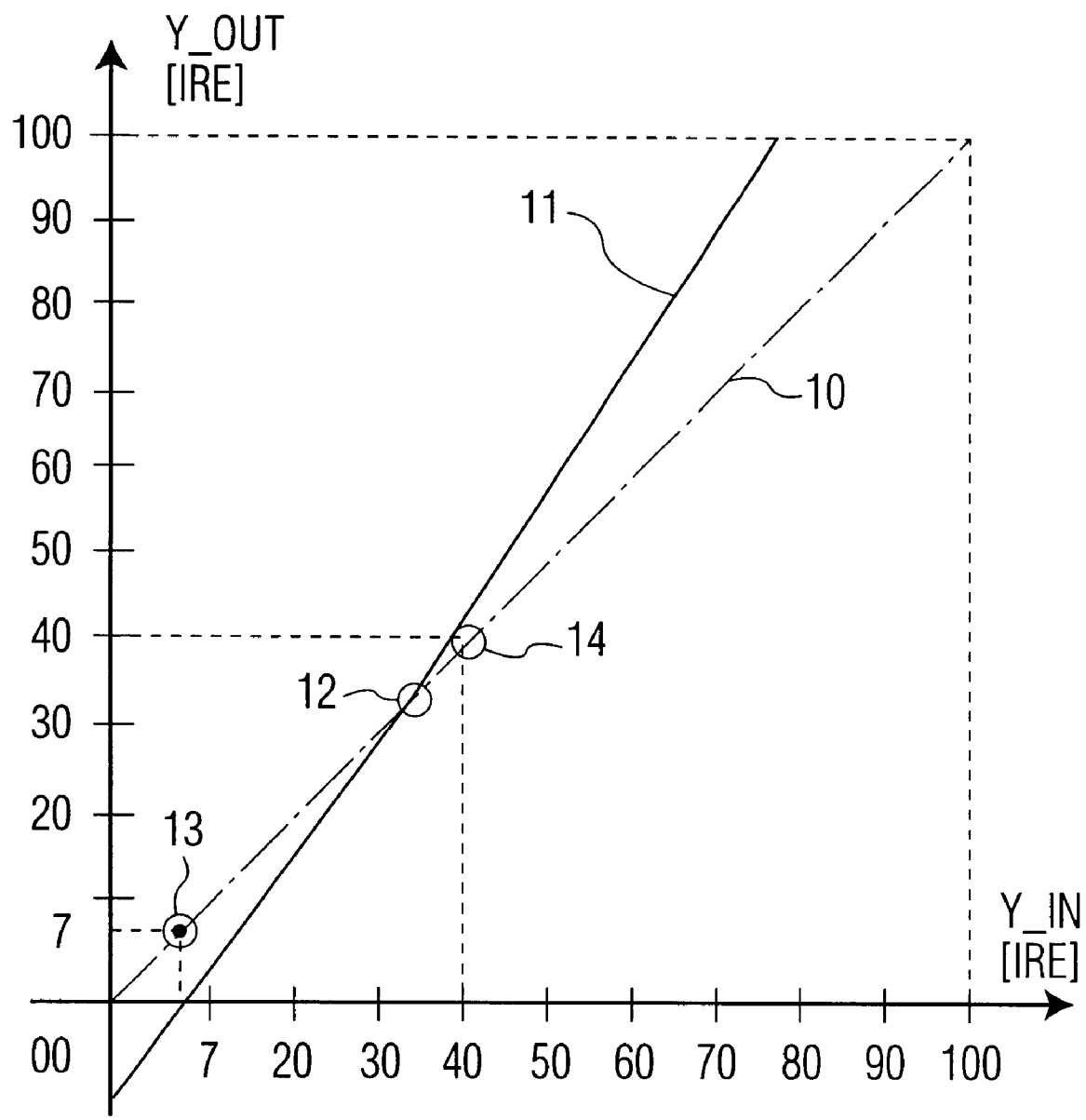
FIG. 1 shows a graph with a dual segment transfer function used for contrast improvement.

This process is shown in FIG. 1. Therein, the effect of the transfer function is shown. In the x-direction of the shown graph the input luminance values Y_IN are depicted. In the y-direction of the shown graph the output luminance values are shown. In both cases the luminance values are given in IRE (institute of radio engineers) units which is an often used unit in the field of video signal processing. A luminance signal with 100 IRE represents the white level of a standard video signal and a luminance signal with 0 IRE represents the black level of a standard video signal.

For the different kinds of displays special adjustments are available so that for a standard video signal test pattern the optimum black and white colours are reproduced. When in video films e.g. dark scenes occur, the displayed video pictures may have low contrast values irrespective of the special adjustments and the pictures seem to be unclear or foggy or the like. So, there is a strong demand of dynamic contrast improvement. When no contrast improvement is made, the transfer function will have the form of a straight line with slope 1, see reference number 10 in FIG. 1.

According to the invention a dual segment transfer function with an adaptive pivot point is used, see reference number 11. The two segments may have different slopes and the adaptive pivot point 12 is the point of intersection of the two segment lines. The parameters of the dual segment transfer function are the two slope values of both segments (hereafter called segment gain value) and the location of the pivot point 12. The lower segment is for dark samples and the upper segment for light samples.

The gain of the lower segment is adaptive to the dark sample distribution. A higher gain results from fewer dark samples and a lower gain from a higher number of dark samples. The gain is limited in the range as given below:

$1.0 \leq Segment1\_Gain \leq Max\_Gain1$

In a preferred embodiment of the invention Max_Gain1 is the value 1.5.

The gain of the upper segment is adaptive to the frame peak value. It is computed in the way that the detected peak value lower than the nominal, will be moved in the direction of the nominal peak value. If the detected peak value is equal or higher than the nominal peak value than a gain of 1.0 is used (no change). The computed theoretical gain is limited then to a maximum value in order to avoid unnatural effects.

$1.0 \leq Segment2\_Gain \leq Max\_Gain2$

In a preferred embodiment of the invention Max_Gain2 is the value 1.7.

The third parameter of the transfer function is the pivot point. It is adaptive to the average image brightness and allows to make dark pictures contrasty and light. Low average brightness moves the pivot point to lower and high average brightness to higher level. In FIG. 1 it is shown that for ease of implementation the pivot point always lies on the straight line 10 and the lowest possible location is the point (x=7 IRE, y=7 IRE) and the highest possible location is the point (x=40 IRE, y=40 IRE), see reference signs 13 and 14.

Figure 2:
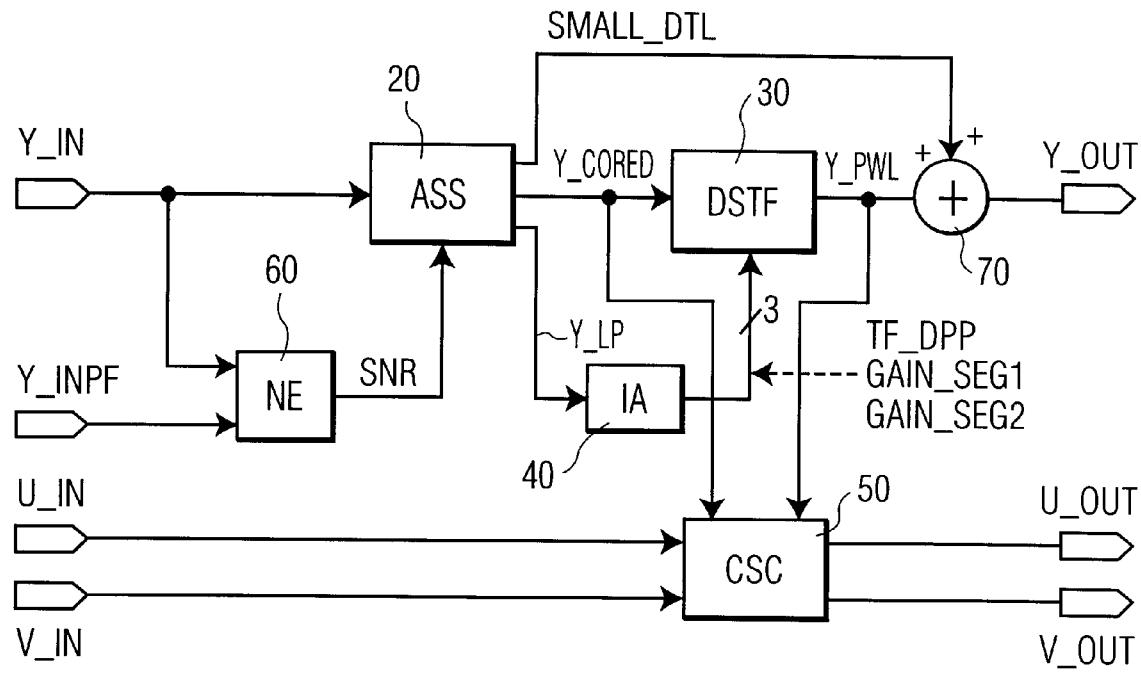
FIG. 2 shows a top level block diagram of the apparatus for dynamic contrast improvement.

Hereinafter, the apparatus for dynamic contrast improvement according to the invention is explained in detail. FIG. 2 shows the top level block diagram of this apparatus. It consists of 5 main blocks adaptive signal splitter 20, transfer function adaptation unit 30, image analysis unit 40, colour saturation unit 50 and noise estimator 60. Four input signals are supplied to the apparatus. Luminance signal Y_IN of the video signal, luminance signal Y_INPF from the previous field and the chrominance signals U_IN and V_IN. From these signals three output signals are generated. These are a modified luminance signal Y_OUT, and modified chrominance signals U_OUT and V_OUT. These signals may be used for further processing or displaying.

Figure 3:
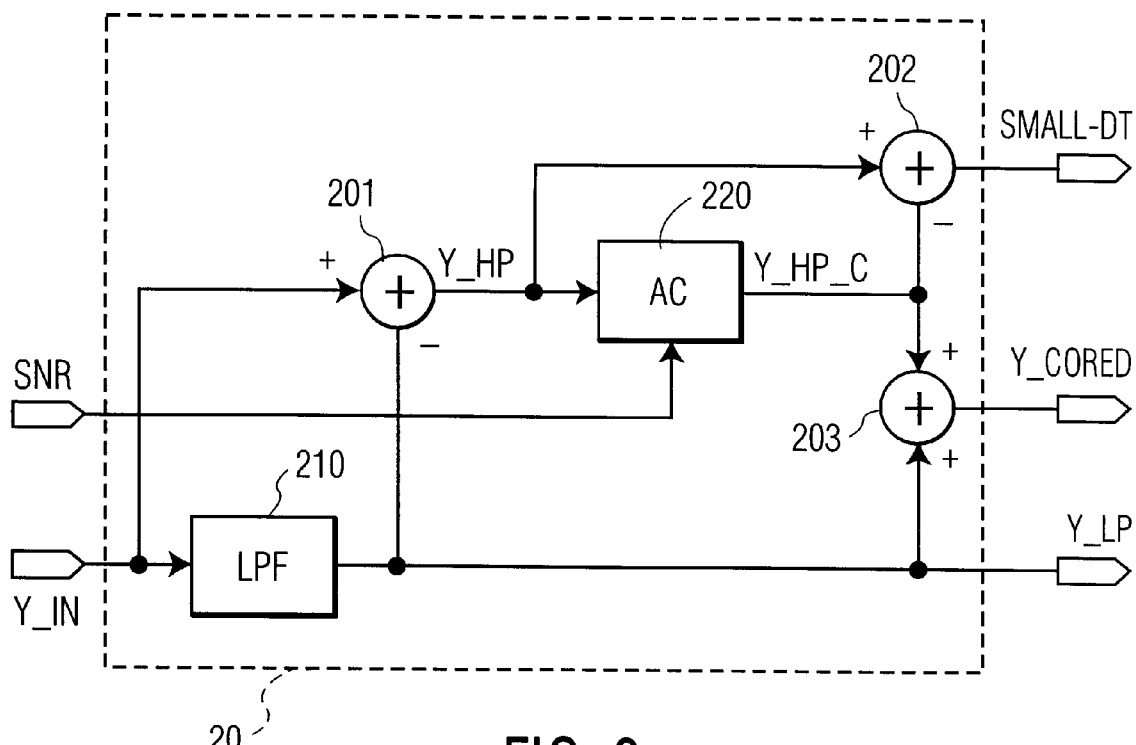
FIG. 3 shows a block diagram of an adaptive signal splitter.

Next the function of the adaptive signal splitter is explained. It consists of the main parts low pass filter 210 and adaptive coring unit 220. This block prepares the luminance signal adaptive to the signal to noise ratio of the luminance signal and provides the three different signals SMALL_DTL, Y_CORED and Y_LP needed for future processing. As shown in FIG. 3, the luminance signal Y_IN is filtered with a low pass filter 210. The low pass filtered signal Y_LP is provided for the use in the image analysis unit 40 as shown in FIG. 2. The high pass component of the luminance signal is generated simply by subtracting the low pass filtered signal Y_LP from the incoming signal Y_IN in adder 201. The high pass signal Y_HP is applied to the adaptive coring unit 220 where the noise and detail signals below the coring level are removed. The coring level is determined by an estimate of the signal to noise ratio SNR provided from block 60 in FIG. 2. The output signal Y_HP_C of the adaptive coring unit 220 is added to the low pass signal Y_LP in adder 203. The result is a noise reduced signal Y_CORED. This signal is provided to the transfer function unit for further processing.

Since the coring function does not distinguish between noise and image signals, a sharpness loss will be caused due to the omission of high frequency small amplitude image signals. Therefore, the signal amount SMALL_DTL cut by the coring unit 220, is added to the processed signal Y_PWL after the whole DCI-processing again, see FIG. 2. This procedure allows to reduce the noise amplification without a loss of small detail signals.

Figure 4:
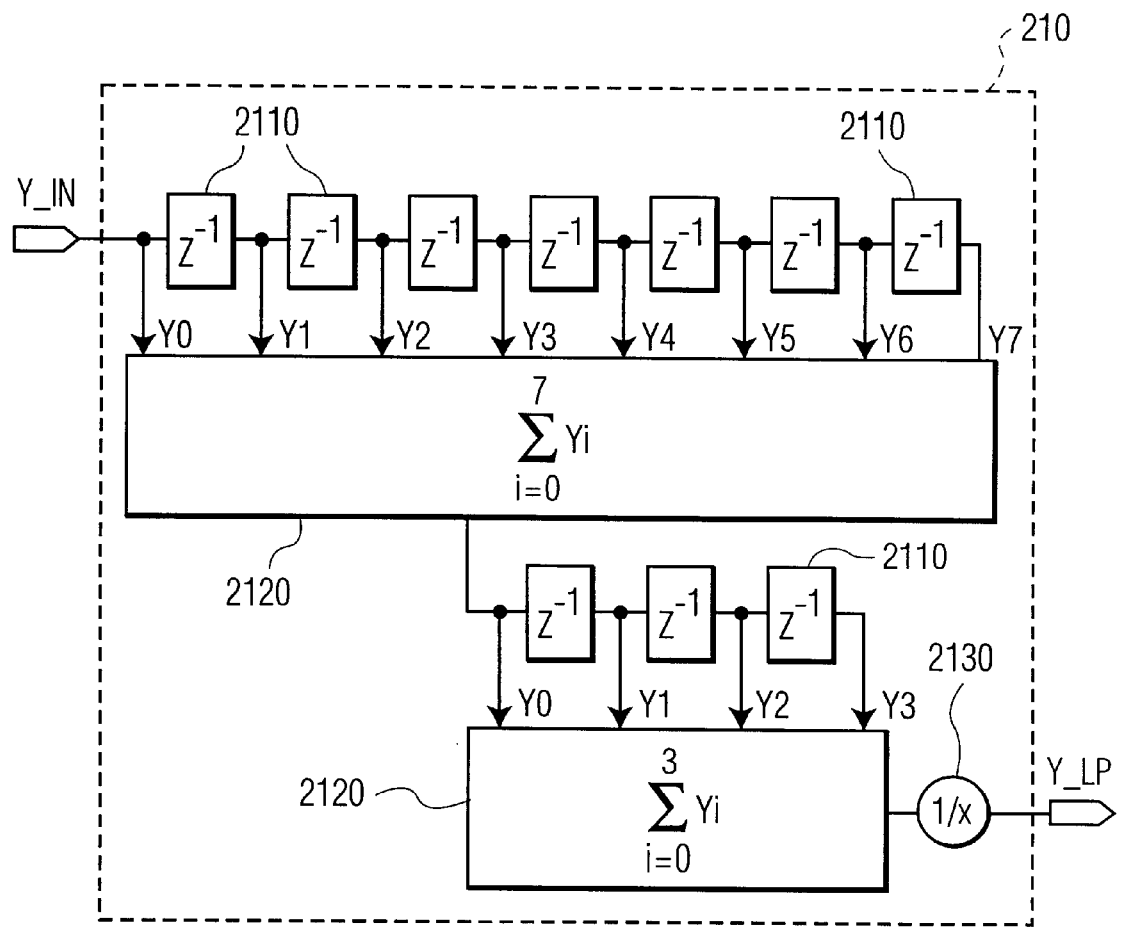
FIG. 4 shows a block diagram of a low pass filter used in the adaptive signal splitter.

The structure of the low pass filter is shown in FIG. 4 Its a common low pass filter structure. Therein, reference number 2110 denotes delay units, reference number 2120 denotes summation stages and reference number 2130 denotes a division stage. The low pass filter has a −3 dB frequency limit at about 700 kHz.

Figure 5:
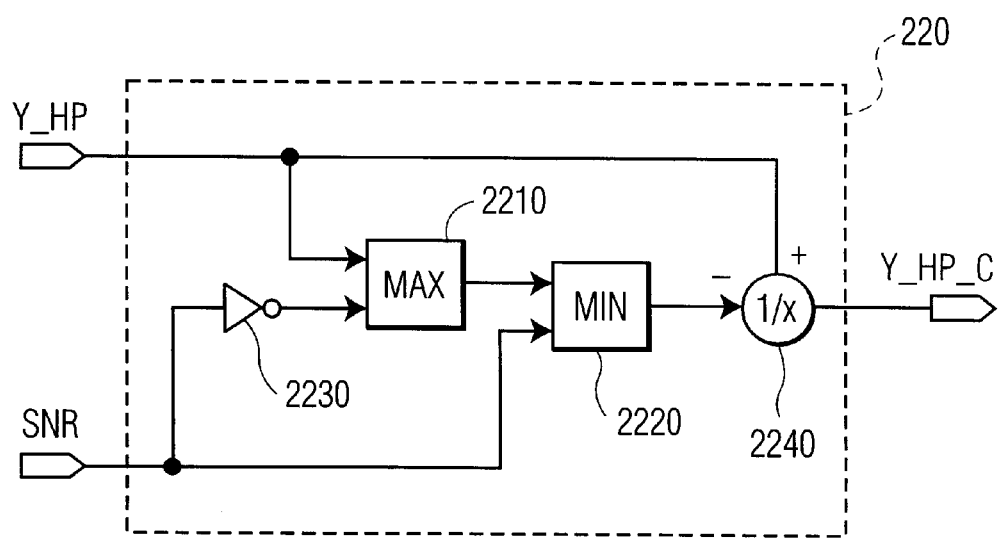
FIG. 5 shows a block diagram of an adaptive coring unit used in the adaptive signal splitter.

The structure of the adaptive coring unit 220 is shown in FIG. 5. Therein reference number 2210 denotes a maximum value selector and reference number 2220 denotes a minimum value selector. Reference number 2230 denotes an inverting unit which performs a multiplication with the factor −1 and reference number 2240 an adder. The function of the adaptive coring unit 220 is shown self explanatory in FIG. 5.

Figure 6:
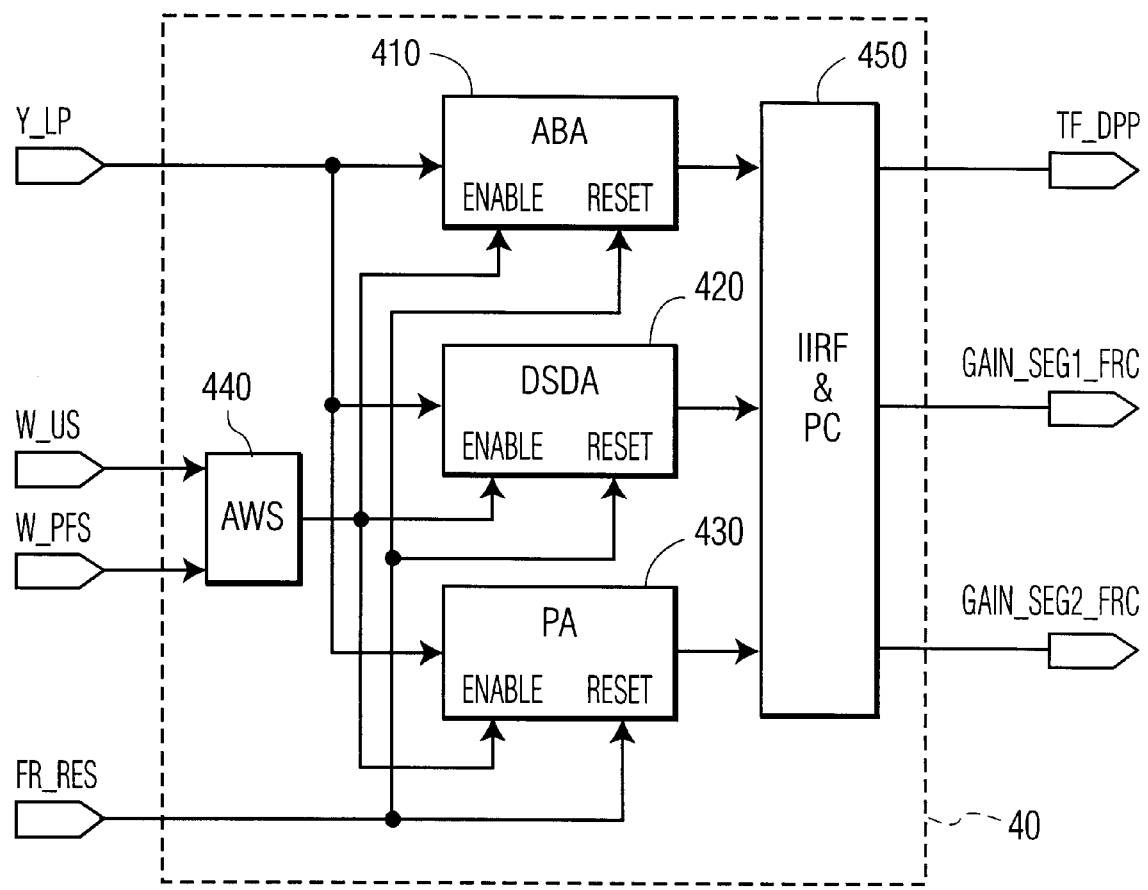
FIG. 6 shows a block diagram of an image analysis unit.

Next, the image analysis unit 40 is explained in greater detail. The basic function of the dynamic contrast improvement process DCI is to analyse the picture framewise in real time and adjust the parameters of a dual segment transfer function depending on the analysis results for the best subjective picture quality. Each image frame is analysed for three different characteristics. The image average brightness, the dark sample distribution and the frame peak value. A block diagram of the image analysis unit 40 is shown in FIG. 6. Reference numbers 410, 420, 430 denotes an average brightness analysis unit, a dark sample distribution analysis unit and a frame peak analysis unit. The output results of these units are processed in a IIR filtering and parameter computation unit 450. After the processing in this unit the parameters of the dual segment transfer function are achieved and they are applied to the next frame not to the current frame because a filtering is necessary anyhow and an instantaneous reaction on small temporal variations is unwanted.

In TV sets, the picture format may be changed in applications like zooming or when a different picture format like letterbox format is received. When a letterbox transmission is received, not all areas of the display include active video portions. In zooming applications it is often the case that not all active video lines are displayed. Therefore care must be taken, that the image analysis function is not falsified by inactive portions or portions which are not displayed. For this purpose an analysis window is defined in analysis window unit 440. The analysis window defines a part within the displayed picture size for analysis. The analysis for DCI functions is enabled within the window and disabled outside the window. In this way it is also possible to disable the analysis in subtitles and logos. The analysis window may be defined by user setting W_US or automatically by a unit which detects the picture format and size W_PFS.

Figure 7:
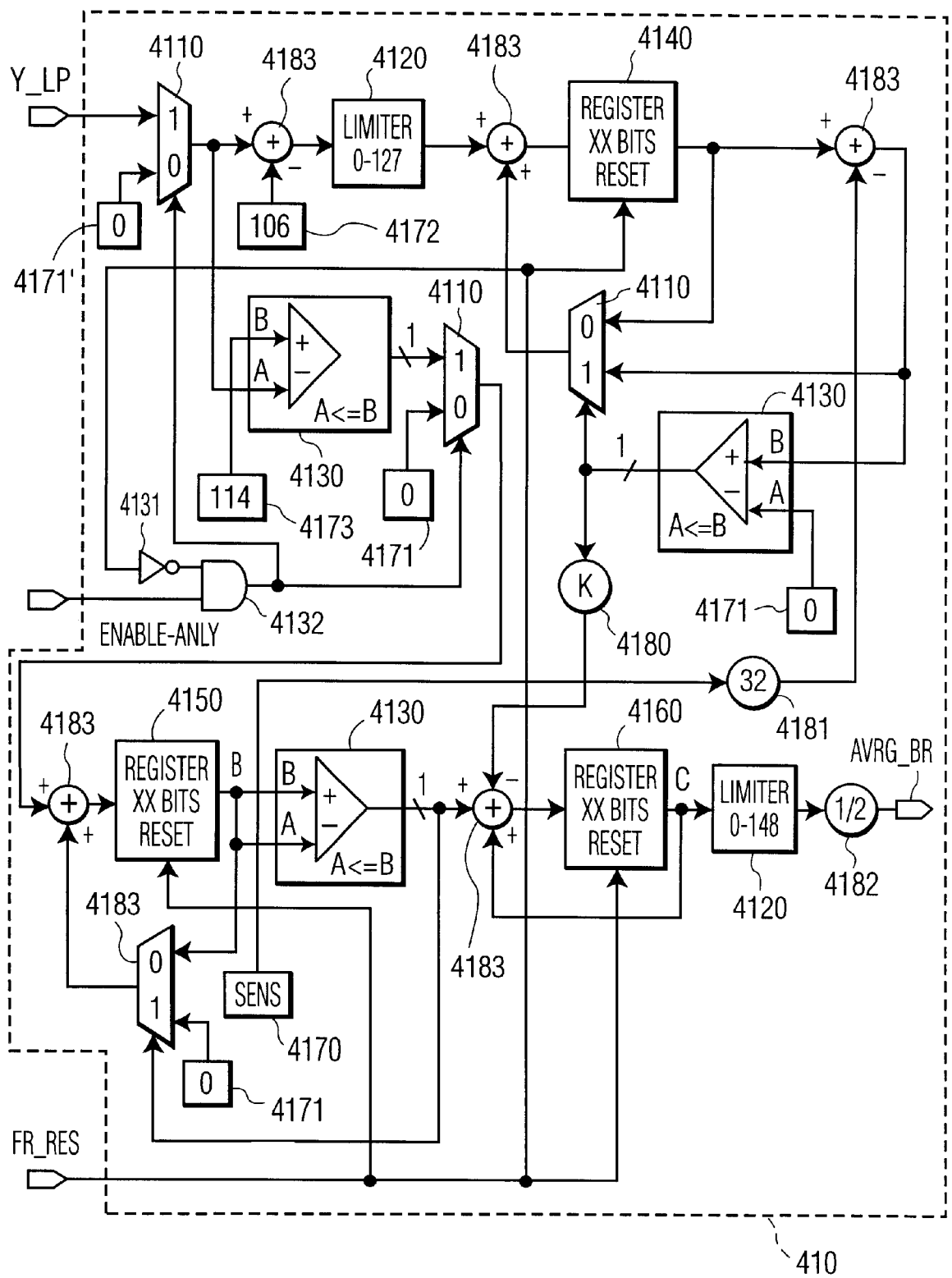
FIG. 7 shows a block diagram of an average brightness analysis unit included in the image analysis unit.

Next the average brightness analysis unit 410 is described in detail. The pivot point of the dual segment transfer function is adaptive to the average image brightness value. It is moved to lower values for dark pictures (having low average brightness values) and it is moved to higher values for light pictures (having higher average brightness values). The analysis is done as shown in FIG. 7. All samples below the dark level threshold value=114 in constant memory 4173 are considered as dark samples. The register 4150 is increased by one for every such sample. When the register value is equal to the parameter value SENS in variable memory 4170 then it is reset and a carryover of one is added to the average register 4160.

All samples higher than a light level threshold value=106 stored in constant memory 4172 are considered as light samples but they are not simply counted like the dark samples. The sample values of them are also taken into consideration for analysis. So the samples in the dark region and the samples in the light region have different contribution to the average brightness analysis. The register 4140 is increased by a value of value=limit((Y_LP−threshold),0, 127)

as long as the register value is lower than the constant value SENS*32. When the value in register 4140 is equal or higher than 32*SENS than it is updated by a value register_A=limit((Y_LP−threshold),0, 127)+(register_A−32*SENS)

and a carryover of K is subtracted from the content in average register 4160 according to the formula register_C=register_C−K The reason for using two difference thresholds for decision between dark and light samples is the desired soft transition. Both threshold values=114 and =106 overlap in a small range called transition range. All the samples within the transition range are considered by both dark and light sample counters represented by registers 4150 and 4140. The average brightness analysis function can be described by equation given below:

$$register\_C = \frac{tsn * p_{dark}}{SENS} - K * \frac{tsn * \sum_{i=1}^{127} p_i * i}{32 * SENS}$$

wherein the variables have the following meanings:
tsn: total sample number within analysis window
pdark: dark sample number related to tsn
$p_i$: light sample number, with a value i of i=limit((sample−threshold),0,127), related to tsn
SENS: parameter; determines the sensitivity
K: parameter; weighting factor The analysis is done framewise and only for samples within the analysis window. At the end of this analysis the register 4160 contains the information about the average image brightness. The result is limited in limiter 4120 according to the given range and divided by 2 in division stage 4182. The final average brightness information determines the position of the transfer function pivot point. All the registers are reset by the frame reset pulse before the analysis for the next frame starts.

Figure 8:
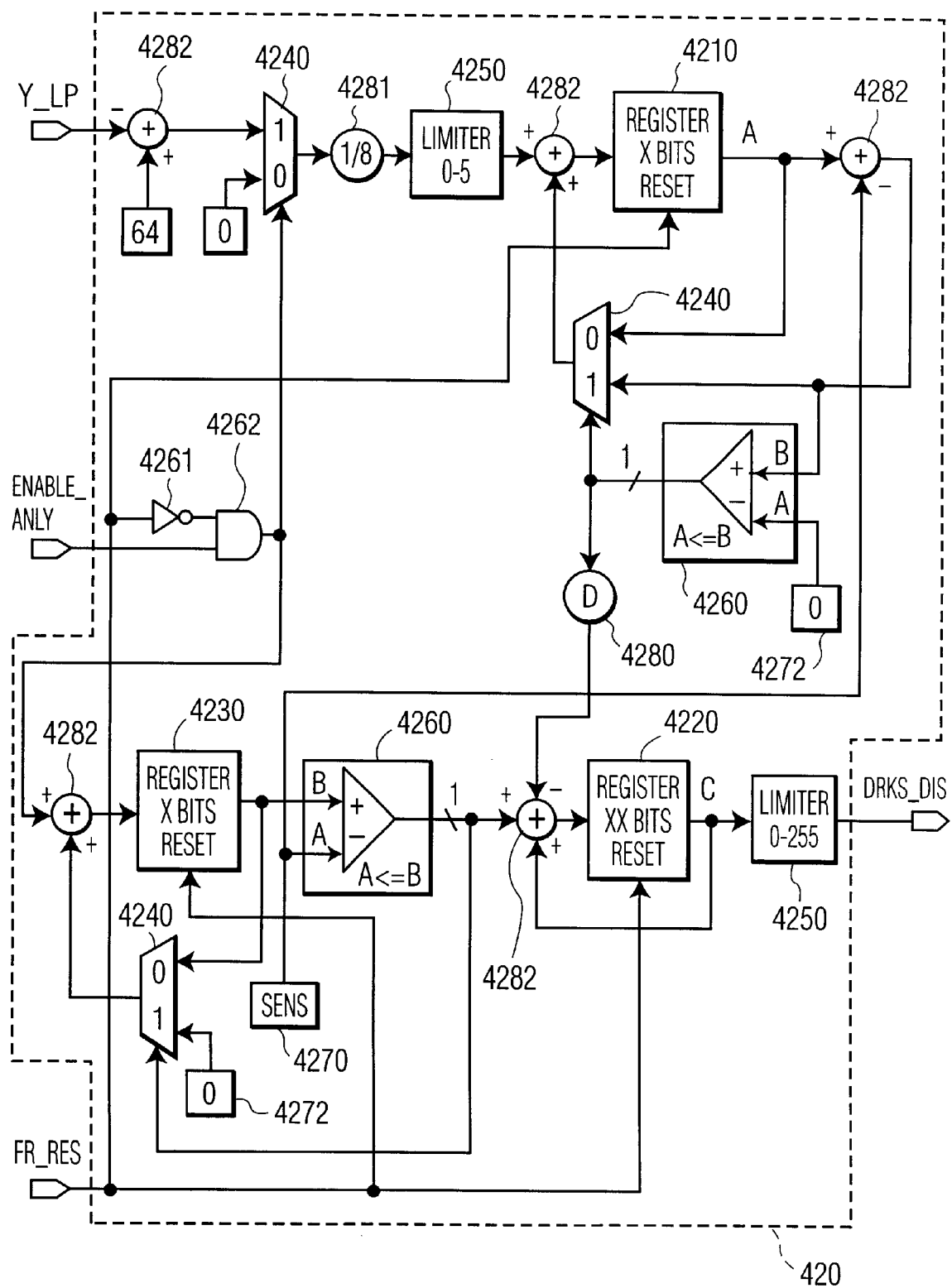
FIG. 8 shows a block diagram of a dark sample distribution analysis unit included in the image analysis unit.

Now the function of the dark sample distribution analysis unit 420 is explained by referring to FIG. 8. The amplitude range from 0 IRE up to about 18 IRE is quantized in 5 steps for dark sample distribution analysis. Samples with amplitude values up to 18 IRE are considered as dark samples. Their quantized values are counted in register 4210 as long as the register value is lower than the parameter value SENS in constant memory 4270. If the register value is equal or higher than the parameter value SENS then it is updated by a value calculated according to the below given formula:

$$register\_A = limit\left(\frac{(threshold - Y\_LP)}{8}, 0, 5\right) + (register\_A - SENS)$$

and a carryover with a value of D is subtracted from the distribution register 4220. The register 4230 counts the total sample number. It's value is increased for every sample inside the analysis window by the value of one. It is reset to zero and a carryover of one is added to register 4220 if the counted sample number is equal to the parameter value SENS.

The analysis is done framewise only for samples within the analysis window. At the end of this analysis the register 4220 contains information about the dark sample distribution and determines the segment gain of the lower segment of the dual segment transfer function. Also here, all the registers are reset before the analysis for the next frame starts.

Figure 9:
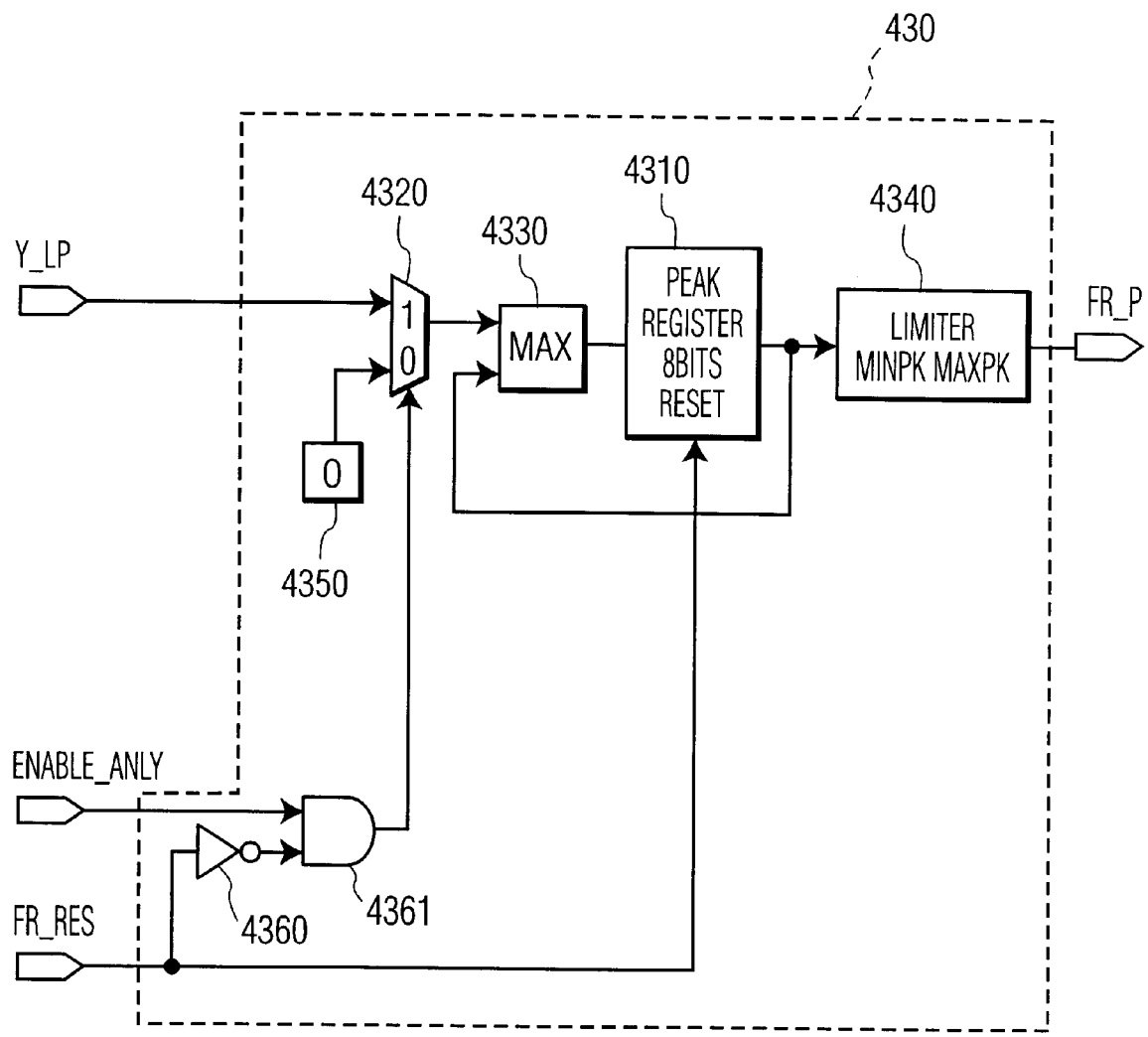
FIG. 9 shows a block diagram of a frame peak analysis unit included in the image analysis unit.

Next the function of the frame peak analysis unit 430 is explained by referring to FIG. 9. The maximum frame peak value is detected by the circuit disclosed in FIG. 9. Each time, the maximum value is stored in register 4310. The detected frame peak value is limited to a certain range so that the segment gain, which is computed in another block, never goes below the value 1.0 and never exceeds a predefined maximum value. The frame peak value determines the gain of the upper segment of the dual segment transfer function as will be explained later on. A relatively simple peak detection like with the peak detector shown in FIG. 9 can cause the problem of making the segment gain too sensitive. Small peaks with higher amplitude can even occur in dark pictures with low peak values e.g. due to reflecting light. The amplitude value of such small peaks can also change temporally even if the picture content does not change. That could cause a modulation of the segment gain. In order to reliably avoid such unwanted effects it is another idea of the invention to take also the size of the peak (lightest part) into consideration.

Figure 13:
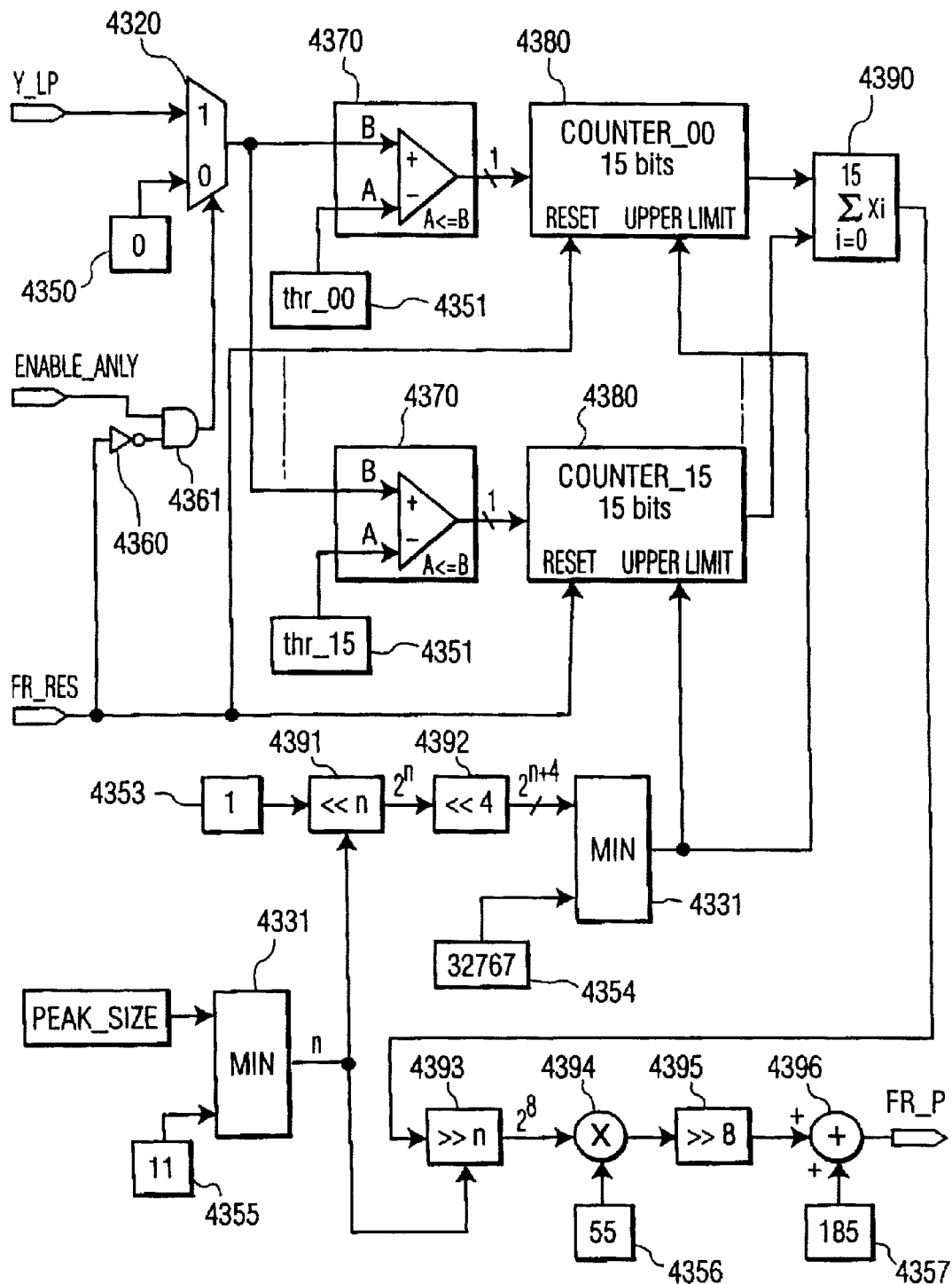
FIG. 13 shows a block diagram of an alternative frame peak analysis unit included in the image analysis unit.

An alternative embodiment for a frame peak analysis unit 430 which accomplishes this task is shown in FIG. 13. All components which are in common with FIG. 9 do have the same reference signs as shown in FIG. 9. The peak detector predicted in FIG. 13 allows the setting of a desired peak size (PEAK_SIZE) in units of pixel numbers. To the peak size value a peak_sample value corresponds as given by the equation below:

$$n = \min(PEAK\_SIZE, 11) \qquad 0 \leq n \leq 11$$

$$peak\_sample = \min(2^{n+4}, (2^{15} - 1)) \quad 16 \leq peak\_sample < 2^{15}$$

The amplitude range relevant for peak detection is set from a minimum peak value of 185 up to a maximum peak value of 240 (for unsigned 8 bit luma signal). This range is subdivided into 16 discrete regions. For each of these regions there is provided a comparator 4370 and a counter 4380. Each counter counts the samples with an amplitude value (pixel value) equal or higher than a threshold thr__00–thr__15 fed to the corresponding comparator. The counters 4390 count during one frame from Zero to an upper limit value peak_sample which is determined according to the equations given above. Contribution of each counter 4380 to the frame peak value is determined by the counter value. A value of peak_sample is considered as 100% contribution and a value of zero as 0% contribution. The value peak_sample for a counter means a 100% peak detection at the given threshold. The counters 4380 count up to a maximum value of peak_sample and then stop. At the end of the analysis the counter values are summed up in adder 4390 and normalized. This is done by a simple right shift operation in shifters 4393 and 4395. Due to the required precision the sum is shifted first only by n bits in shifter 4393 instead of (n+4+4). Then the result is multiplied with step number 55 (steps between minimum and maximum peak value 240–185=55) in multiplier 4394. The final normalization is done by a right shift operation of 8 bits in shifter 4395. The result is the relative peak value related to the minimum peak value of 185. The sum of relative and minimum peak value calculated in adder 4396 provides the absolute peak value. The arrangement with minimum value selectors 4331 and left shifters 4391 and 4392 serves for the determination of the upper limit value (peak_sample) for the counters 4380 from the prdetermined peak size value PEAK_SIZE.

The threshold values thr_j are given by the equation below:

$$thr\_j = 185 + (int)\left(\frac{55.0 * (j+1)}{16.0} + 0.5\right)$$

$$0 \leq j < 16$$

For the values from j=0 to 15 the results of this formula are presented in the table below:

| j | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| thr_j | 188 | 192 | 195 | 199 | 202 | 206 | 209 | 213 | 216 | 219 | 223 | 226 | 230 | 233 | 237 | 240 |

Figure 10:
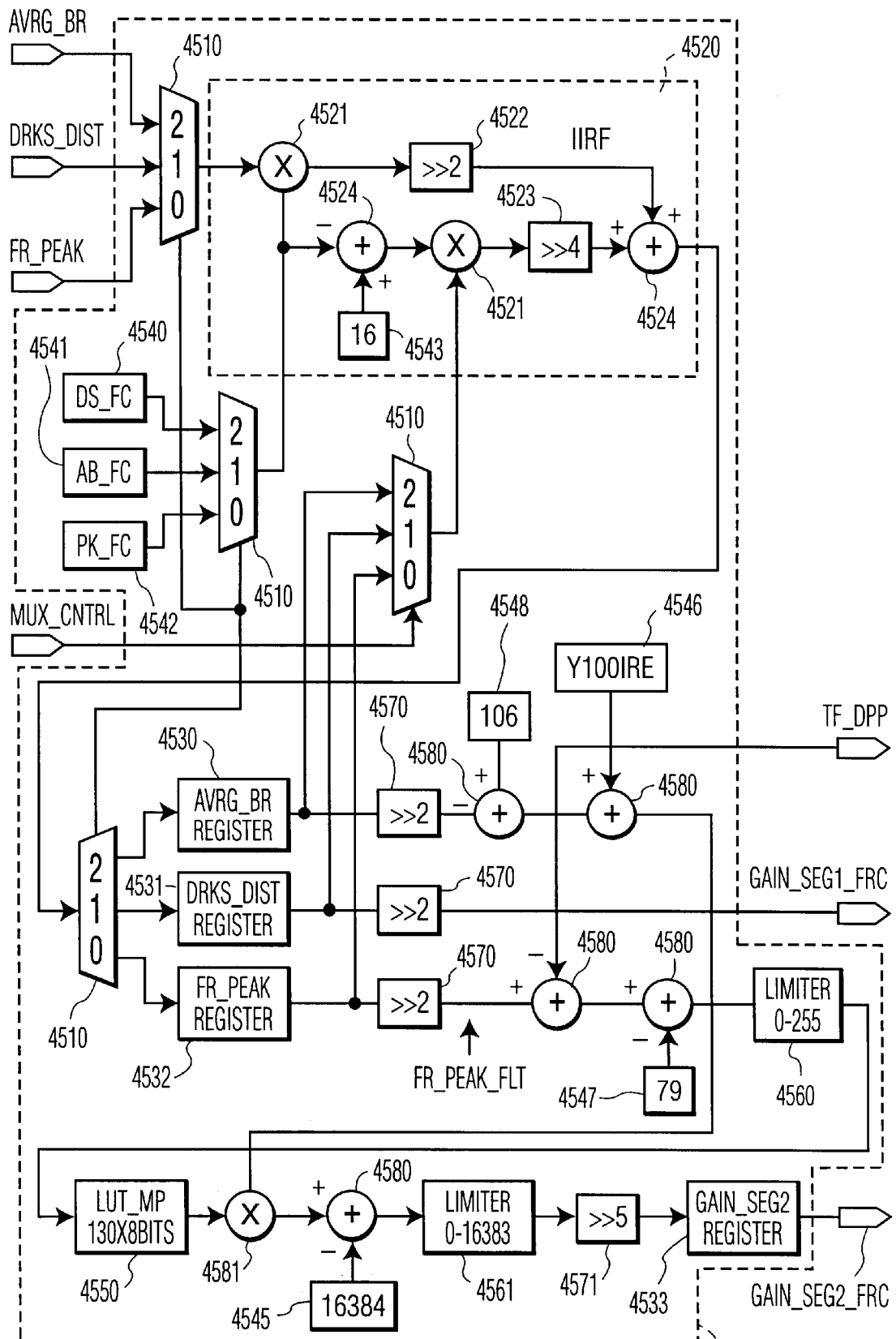
FIG. 10 shows a block diagram of an IIR filter unit and a parameter computation unit included in the image analysis unit.

The image analysis unit provides information for each frame about the average brightness, dark sample distribution and frame peak value. These values determine the characteristic of the transfer function used for the next frame. All these three values are filtered with an IIR filter (Infinite Impulse Response Filter) and stored framewise. The filter unit is denoted with the reference sign 4520 in FIG. 10. It consists of multipliers 4521, bit shifters 4522 and 4523 which divide the input samples by the factors $2^2=4$ and $2^4=16$ respectively, adders 4524 and constant memory 4543. The filter time constants are determined by the user settings AB_FC for average brightness values, DS_FC for dark sample distribution values and PK_FC for peak values in respective variable memories 4540, 4541 and 4542. The filtering of all three image analysis values is done in time multiplexed fashion with the same hardware as shown in FIG. 10. A multiplex control signal MUX_CTRL switches the corresponding multiplexers 4510. All the computations in the filtering and parameter computation unit 450 are done within the vertical blanking time.

The filtered values are used to compute the parameters of the dual segment transfer function. The filtered average brightness information is divided by 4 and then subtracted from a constant value of 106. The result is the pivot point value (TF_DPP). The filtered dark sample distribution value provides the gain for the first segment (lower segment) of the dual segment transfer function, also after division by 4 in bit shifter 4570. An additional processing is necessary in order to get the gain for the second segment (upper segment), derived from the filtered peak value. The gain is computed so that the filtered peak values, lower than 100 IRE, are transferred to 100 IRE. As explained above, the detected peak value has been limited in frame peak analysis unit 430 to a certain range so that the segment gain never goes below 1.0 and never exceeds a predefined maximum value, e.g. 1.7. The maximum gain is defined in respect to preserving natural picture quality. These conditions are expressed in mathematical form below:

peak=limit(peak, MINPEAK, 100IRE) $1.0 \leq GAIN\_SEG2 \leq max\_gain2$

The gain is determined, as given in equation below, by the filtered peak value and the pivot point position.

$$GAIN\_SEG2 = \frac{Y100IRE - TF\_DPP}{FR\_PEAK\_FILT - TF\_DPP}$$

Therein, the variables stand for:
GAIN_SEG2: Segment-2 gain for dual segment transfer function
Y100IRE: Luminance signal 100 IRE value
TF_DPP: Transfer function pivot point value
FR_PEAK_FILT: Filtered luminance peak value The computation of the segment gain according to this equation requires a division operation. That can be done with a multiplier 4581 and a lookup table 4550. The look-up table contains the results of $$\frac{1}{FR\_PEAK\_FILT - TF\_DPP}$$

with a precision of n bits, as given in table below:

X=FR_PEAK_FILT-TF_DPP $X_{min}$=FR_PEAK_FILT$_{min}$-TF_DPP$_{max}$ $X_{max}$=FR_PEAK_FILT$_{max}$-TF_DPP$_{min}$ ROM_Address=X-X$_{min}$ $$ROM\_Value = \frac{2^n}{X} \quad n: number\ of\ fraction\ bits$$

for FR_PEAK_FILT$_{min}$=185 FR_PEAK_FILT$_{max}$=240
⇒ TF_DPP$_{min}$=32 TF_DPP$_{max}$=106

| X = FR_PEAK_FILT-TF_DPP | ROM_Address = X-Xmin | ROM_Value = $2^n$/X for n = 14 |
|---|---|---|
| 79 | 0 | 207 |
| 80 | 1 | 204 |
| 81 | 2 | 202 |
| . | . | . |
| . | . | . |
| 206 | 127 | 79 |
| 207 | 128 | 79 |
| 208 | 129 | 78 |

The transfer function segment for luminance signals higher than the pivot point is given by the equation Yout=gain_seg2* (Y$_{in}$-TF_DPP)+TF_DPP Y$_{in}$>TF_DPP wherein
Yout: Output luminance signal
Yin: Input luminance signal.

When the segment gain is split into integer and fraction part wherein the integer part is always 1, the following formulas apply:

GAIN_SEG2GAIN_SEG2_INT+GAIN_SEG2_FRC=1+GAIN_SEG2_FRC Y$_{out}$=GAIN_SEG2_FRC*(Y$_{in}$-TF_DPP)+Y$_{in}$Y$_{in}$>TF_DPP Using only the fraction part saves one bit. Therefore, the integer part is subtracted from the computed gain. The result is written into the register 4533. The computed parameters TF_DPP, GAIN_SEG1_FRC and GAIN_SEG2_FRC, determine the transfer function dynamic pivot point, fraction part of segment gain 1 and fraction part of segment gain 2. They are supplied to the dual segment transfer function unit. The computation has to be completed at latest before the first active data of the next frame. The parameters are frozen during the flow of active data of the frame.

Figure 11:
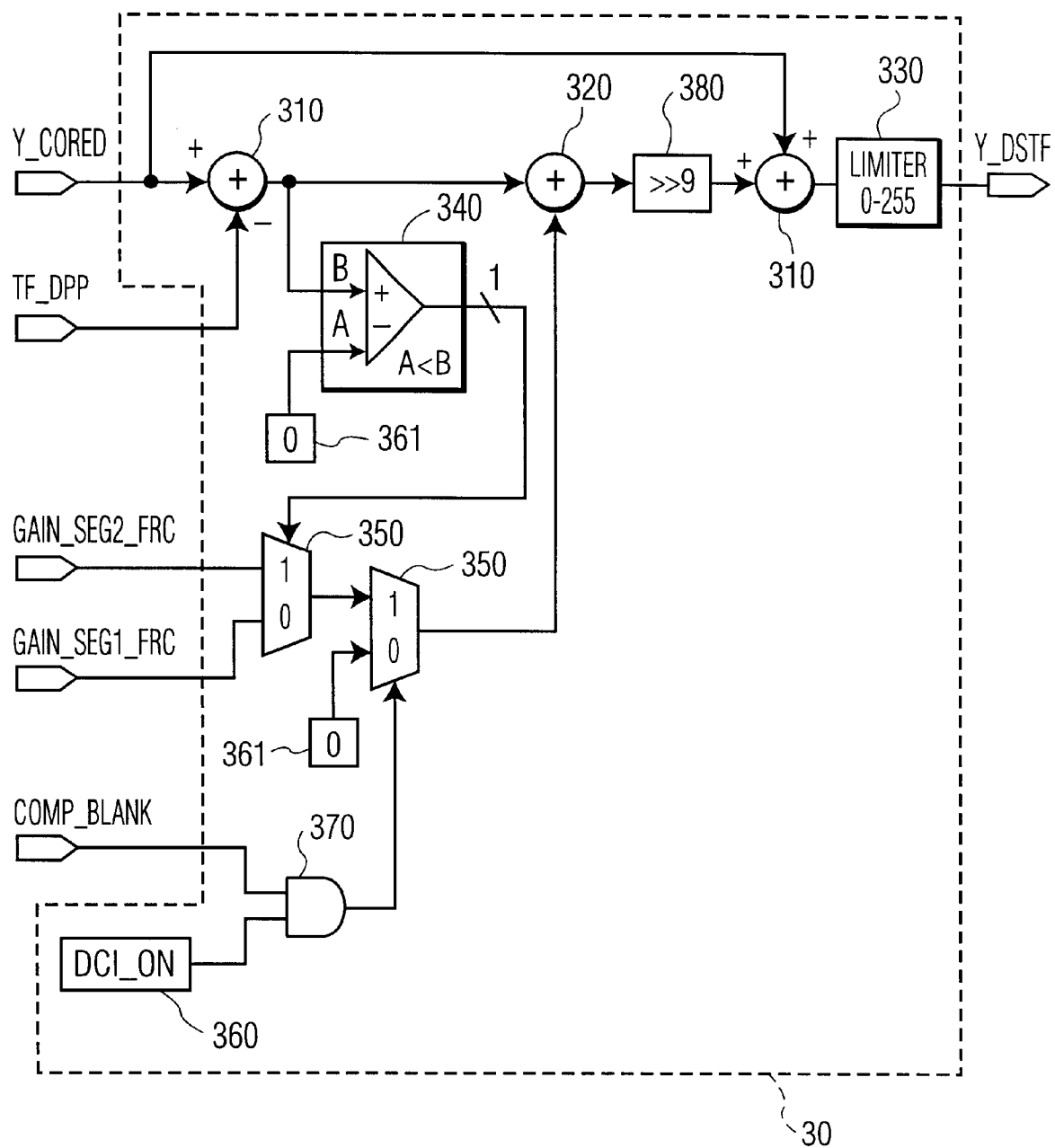
FIG. 11 shows a block diagram of a transfer function adaptation unit.

Next the transfer function unit is explained in detail with reference to FIG. 11.

The dynamic contrast improvement video processing is based mainly on the dual segment transfer function. The parameters are provided from the common IIR filter and parameter computation unit 450. The application of the dual segment transfer function can be easily expressed with the following mathematical expressions:

for Y_CORED≦TF_DPP

Y_DSTF=(Y_CORED-TF_DPP)*GAIN_SEG1_FRC+Y_CORED for Y_CORED>TF_DPP

Y_DSTF=(Y_CORED-TFD_PP)*GAIN_SEG2_FRC+Y_CORED

Y_CORED: Input signal
Y_DSTF: Output signal
TF_DPP: Transfer function dynamic pivot point
GAIN_SEG1_FRC: Fraction part of first segment (lower segment) gain
GAIN_SEG2_FRC: Fraction part of second segment (upper segment) gain The DCI processing can be switched on and off by the user setting parameter DCI_ON. It is switched off during the horizontal and vertical blanking time via composite blanking signal COMP_BLANK. A hardware implementation of these calculations is shown in FIG. 11 in a self explanatory manner.

Figure 12:
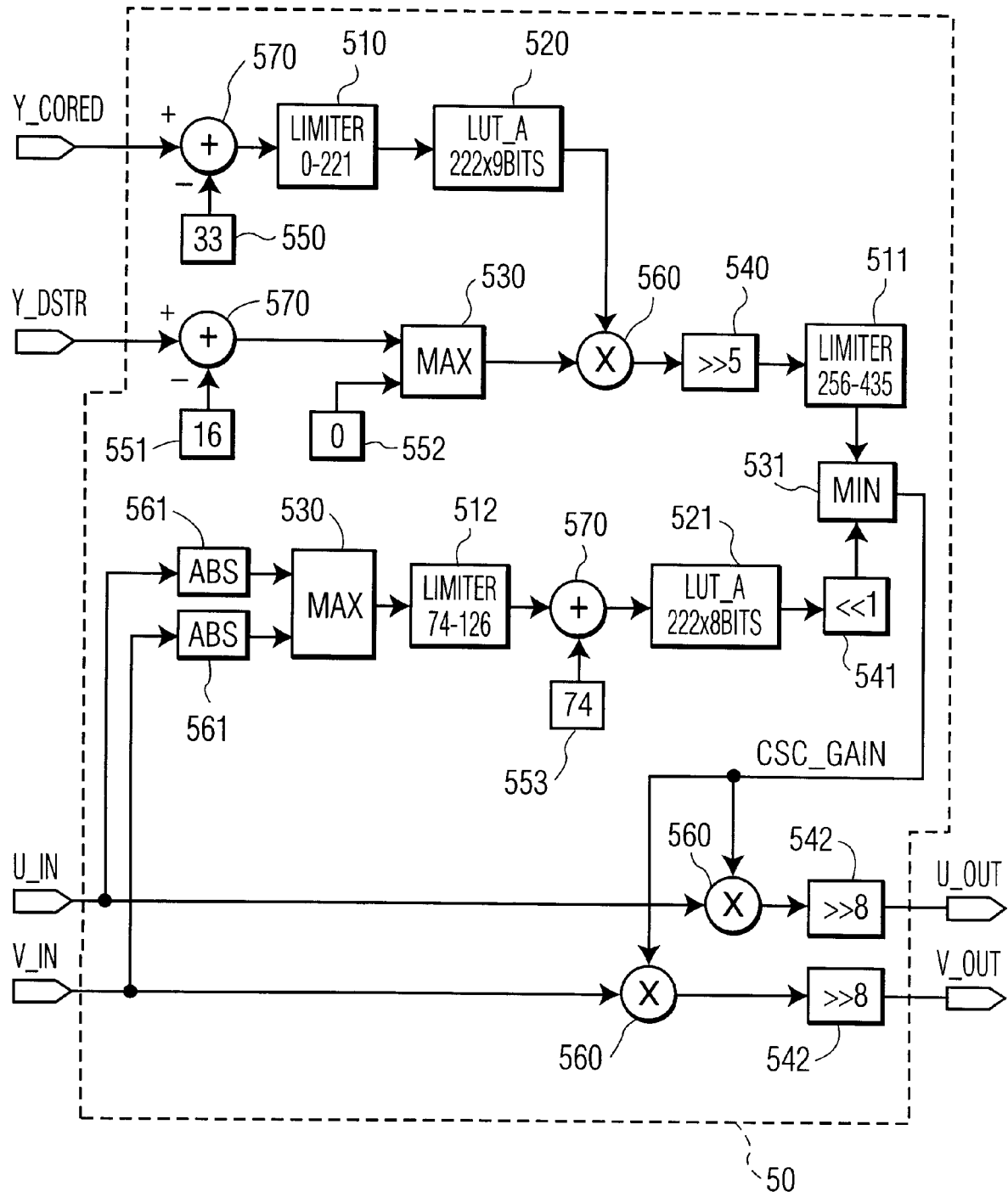
FIG. 12 shows a block diagram of a colour saturation compensation unit.

Due to the non linear luminance processing in the transfer function unit the colour saturation is changed. This effect is compensated by multiplication of chrominance samples with a compensation gain. This is done in colour saturation compensation unit 50 which is shown in detail in FIG. 12. The basic function of this unit is expressed in the following formula:

$$GAIN\_CSC = \frac{Y\_DSTF - Y_{bl}}{Y\_CORED - Y_{bl}}$$

wherein
Y_CORED: Input luminance value of dual segment transfer function
Y_DSTF: Output luminance value of dual segment transfer function Ybl: Black level.

The expression $1/(Y\_CORED-Y_{bl})$ is approximated by a look-up table 520. The gain value results from the product of $(Y\_DSTF-Y_{bl})*(1/(Y\_CORED-Y_{bl}))$.

The colour saturation compensation is only done for desaturated colours. The desaturation occurs in the second segment from the pivot point up to 100 IRE. In the first segment from 0 IRE up to the pivot point the colour saturation can only be increased. A compensation in this area would fade the colours.

The contents of the look-up table can be given by the following expressions:

$$X=Y\_CORED-Y_{bl} \text{ for } Y\_CORED>TF\_DPP_{min}$$

$$Y\_CORED_{min}=TF\_DPP_{min}+1$$

$$X_{min}=Y\_CORED_{min}-Y_{bl}$$

$$ROM\_Value = \frac{2^n}{X}$$

$$ROM\_Address=X-X_{min} \text{ for } X \geq X_{min}$$

n is the number of fraction bits and determines the precision of approximation.
for Xmin=17 and Xmax=238

$$ROM\_Value = \frac{2^n}{X}$$

In seldom cases the compensated chrominance component values can exceed the maximum range representable with the given number of bits. Therefore, the maximum allowed colour compensation gain is computed for each chrominance sample with the components absolute value calculator 561, maximum selector 530, limiter 512, adder 570, constant memory 553, look-up table 521 and bit shifter 541. The colour saturation compensation gain is limited by using the look up table 521 if it is higher than the allowed value so that a perceptible tint error is avoided.

An alternative embodiment for determining the colour saturation compensation gain is now explained. According to this alternative embodiment the color saturation compensation gain is determined by the following formular:

$$CSC\_GAIN=Y\_PWL/Y\_CORED$$

wherein Y_PWL is the luminance output signal after applying the dual segment transfer function to the luminance component and Y_CORED is the input luminance signal component to which the transfer function is applied (see FIG. 2).

For every chroma data pair U and V a maximum allowed colour saturation compensation gain CSC_GAINmax is computed as given by the following formula:

$$CSC\_GAINmax=max\_value/max(abs(U), abs(V))$$

wherein the max_value is constant for a given chroma value representation, e.g. for a signed 8 bit representation the max_value is equal to +127. Max(abs(U), abs(V)) stands for the maximum absolute value of a chroma data pair. If the color saturation compensation gain, computed according to the formula given above for CSC_GAIN is higher then the maximum allowed gain CSC_GAINmax, then the maximum allowed gain CSC_GAINmax will be used in order to prevent a tint error cased by U or V value limitation.

Next, some details concerning the noise estimator 60 are explained. The coring threshold SNR used in the adaptive signal splitter part determines the amount of high frequency small signal amplitude suppression in the processed luminance signal. It is desirable to have for low noise video material small coring levels and for noisy video material large coring levels. The system performance can be optimised by controlling the coring levels depending on the noise level in the video material. The noise is measured by the noise estimator 60.

The noise estimator estimates the noise level in the active portion of the video signal. Normally in each picture there are small blocks with minimum change of video contents. These blocks are suitable for noise measurement. The pixels of successive fields representing nearly the same spatial location are normally highly correlated and the absolute difference provides a noise information. Due to the statistical variation of noise an averaging of noise levels is necessary. Each filed is subdivided into small blocks of 64 pixels. The absolute difference of pixels between successive fields is averaged over each block. The blocks containing spatial and/or temporal changes do not provide the correct noise level. Their consideration would provide a noise level much higher than the present noise. Therefore the block with the minimum noise level is taken for the noise estimation. This is expressed in the formula given below.

$$Noise\_level = \min\left(Noise\_level, \sum_{j=0}^{63} abs(X_j - Xpf_j)\right)$$

wherein
Xpixel: Pixel j of current field
Xpf: Pixel j of previous field.

The new dynamic contrast improvement method and apparatus will be mainly used in video display devices like direct view TV sets or projection TV sets. In plasma and LCD display applications its use brings the best benefit.

The new dynamic contrast improvement method has been explained in detail with block diagrams for hardware implementations. It goes without saying that instead of the disclosed block diagram corresponding software implementations could be used.

The invention is not restricted to the disclosed embodiments. Various modifications are possible and are considered to fall within the scope of the claims. E.g. a somewhat total different transfer function than the dual segment transfer function may be used. More specifically the given restrictions concerning the location of the pivot point may be modified. The whole dynamic contrast improvement method and apparatus is adapted to a framewise processing organization. This could be changed to fieldwise processing organization.

What is claimed is:

1. Method for dynamic contrast improvement of video pictures comprising the steps of analysing the video pictures framewise or field wise in real time regarding their picture content and adjusting the parameters of a transfer function which determines the amount of alteration of the luminance and/or chrominance signal of the video picture for contrast improvement, wherein the transfer function is a dual segment transfer function with an adaptive pivot point which separates the two segments, the picture frames or fields are analysed for the following characteristics:

image average brightness; and
dark sample distribution, and the adaptive pivot point is adapted in dependence on the image average brightness value, and the dark sample distribution value is used to determine the segment gain of the lower segment of the dual segment transfer function.

2. Method according to claim 1, wherein the picture frames or fields are further analysed for the characteristic frame or field peak value, and the frame/field peak value is used to determine the segment gain of the upper segment of the dual segment transfer function.

3. Method according to claim 1, wherein the analysis of the video pictures is done within an analysis window which is preset or adjusted in size dependent on the received picture format.

4. Method according to claim 1, wherein the adaptive pivot point is moved to lower values for dark pictures with relatively low average brightness value and to higher values for light pictures with relatively high average brightness value.

5. Method according to claim 2, wherein the width of the peaks is taken into account for frame/field peak analysis.

6. Method according to claim 2, wherein the image average brightness values, the dark sample distribution values and the frame/field peak values are filtered with an IIR filter.

7. Apparatus for dynamic contrast improvement of video pictures comprising:

an image analysis unit wherein the video pictures are analysed frame wise or field wise regarding to their picture content;

a transfer function adaptation unit wherein the transfer function for the luminance and/or chrominance signal of the video pictures is adapted dependent on the results of the image analysis unit; and an adaptive signal splitter in which a noise reduced luminance signal is generated which is processed in the transfer function adaptation unit.

8. Apparatus according to claim 7, wherein the adaptive signal splitter comprises a low pass filter, in which the luminance signal of the video picture is filtered, the low pass component of the luminance signal being fed to the image analysis unit.

9. Apparatus according to claim 8 further comprising an adaptive coring unit wherein the high pass component of the luminance signal is reduced from noise and small detail signal components by using an estimate of the signal to-noise ratio of the luminance signal and a corresponding coring level is applied to the high pass component of the luminance signal.

10. Apparatus according to claim 9, wherein the signal component which is cut by the adaptive coring unit is provided at one output of the adaptive signal splitter and fed to an adder where it is added to the output signal of the transfer function adaptation unit.

11. Apparatus according to claim 7, wherein the image analysis unit comprises one or more of the following components:

an average brightness analysis unit, a dark sample distribution analysis unit, a peak analysis unit.

12. Apparatus according to claim 11 wherein the peak analysis unit includes a number of counters which count pixel values lying above corresponding thresholds and wherein the counting results are summed up for peak value determination.

13. Apparatus for dynamic contrast improvement of video pictures comprising:

an image analysis unit wherein the video pictures are analysed frame wise or field wise regarding to their picture content;

a transfer function adaptation unit wherein the transfer function for the luminance and/or chrominance signal of the video pictures is adapted dependent on the results of the image analysis unit; and a color saturation compensation unit which compensates for the color saturation effect due to the none-linear processing of the luminance component in the transfer function adaptation unit.

14. Apparatus according to claim 13 wherein the color saturation compensation gain is determined by the following formula:

$$CSC\_GAIN = Y\_PWL/Y\_CORED$$

wherein Y_PWL is the luminance output signal after applying the dual segment transfer function to the luminance component and Y_CORED is the input luminance signal component to which the transfer function is applied.

15. Apparatus according to claim 14, wherein for every chrominance data pair U and V a maximum allowed colour saturation compensation gain CSC_GAINmax is computed as given by the formula:

$$CSC\_GAINmax = max\_value/max(abs(U), abs(V))$$

wherein the max_value is constant for a given chroma value bit representation, and Max(abs(U), abs(V)) stands for the maximum absolute value of a chroma data pair.

\* \* \* \* \*